(12) United States Patent
Gupta et al.

(10) Patent No.: US 7,397,815 B2
(45) Date of Patent: Jul. 8, 2008

(54) METHOD AND APPARATUS FOR PERFORMING LINK DEFRAGMENTATION SUBJECT TO AN INTERFACE RATE CONSTRAINT

(75) Inventors: Bhawna Gupta, Whitehouse Station, NJ (US); Pankaj Risbood, Roselle, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 659 days.

(21) Appl. No.: 11/044,974

(22) Filed: Jan. 27, 2005

(65) Prior Publication Data

US 2006/0165122 A1 Jul. 27, 2006

(51) Int. Cl.
*H04L 12/43* (2006.01)
(52) U.S. Cl. ...................... 370/458; 370/907
(58) Field of Classification Search ............... 370/394, 370/395.51, 465–474, 907, 458
See application file for complete search history.

(56) References Cited

U.S. PATENT DOCUMENTS 5,987,027 A * 11/1999 Park et al. .................. 370/360
6,594,279 B1 * 7/2003 Nguyen et al. .............. 370/468
2004/0165540 A1   8/2004 Acharya et al.

OTHER PUBLICATIONS

S. Acharya et al., "MöbiPack: Optimal Hitless SONET Defragmentation in Near-Optimal Cost," IEEE Infocom, 11 pages, 2004.

* cited by examiner

*Primary Examiner*—Charles D. Garber
*Assistant Examiner*—Matthew Campbell (57) ABSTRACT

Techniques for defragmenting at least one time division multiplexed link in a communication system, wherein provisioned circuits corresponding to traffic demands are assigned to particular time slots of the link. An optimum layout of free space for the link is computed, subject to an interface rate constraint that may be specified as a minimum cross-connect rate and a maximum cross-connect rate. Particular free slots from the optimum layout of free space are selected, and a hitless migration sequence is determined for migrating one or more of the circuits to one or more of the selected free slots. The time slot assignments of one or more of the circuits are adjusted in accordance with the determined migration, sequence in order to defragment the link.

20 Claims, 7 Drawing Sheets

PHASE III

- *Input*:
    1) STS-$N$ link with $N$ slots.
    2) Circuit set $D$ of $G$ different granularities and demand to slot map $\psi$.
    3) OLS set $\{O_1, \ldots, O_h\}$. Let $g_h$ be the highest granularity in the set.

- *Output*:
    1) List $L$ of demands to be moved
    2) Bit mask $B_i$ corresponding to each $g_i \in G$

- *Algorithm*:
    1) Let $B$ be a bit mask of size of $N$ initialized to 0.
    2) Set $i = h$, the highest granularity in the OLS set.
    3) For each circuit $d \in D$ of granularity $g_i$ or higher find $\psi(d) = (t, g_r)$ and set all bits from $t$ to $t + g_r - 1$ as 1 in $B$.
    4) For all valid slots $s$ is $S_i$
        a) Initialize new list $T$.
        b) If bit corresponding to $s$ in $B$ is not set
            i) Find the number of demands in slots from $s$ to $s + g_i - 1$. These demands will have to be moved if these slots are chosen to be cleared.
            ii) Add the count of these demands corresponding to $s$ to a list $T$
    5) Sort $T$ and find first $O_i$ elements. These are the $O_i$ slots that will be cleared.
    6) Mark the demands currently using these slots and append to $L$.
    7) Set $B_i = B$.
    8) Set bits in $B$ corresponding to the slots identified in Step 5 to 1.
    9) For each demand of granularity $g_k$ identified to be moved in Step 6, increment $O_k$ in OLS by 1.
    10) Set $i = i - 1$
    11) If $g_i$ is 1 (i.e., STS-1), set all bits corresponding to slots that are in use and save mask at $B_1$ and exit Phase II.
    12) Go to step 3.

PHASE IV

- *Input*:
    1) List $L$ of circuits to be moved

- *Output*:
    1) Migration sequence $M = <l, s_0, s_n>, \forall l \in L$, $s_0$ and $s_n$ being the old and new slots respectively.

- *Algorithm*:
    1) Sort $L$ in ascending order of granularity.
    2) For each demand $d$ of granularity $g_j$ in $L$
        a) Find first valid slot $s$ in $S_j$ which bit mask in $B_j$ is 0.
        b) Append $<d, s_d, s>$ to $M$ where $s_d$ is $d$ current slot
    3) When done, space corresponding to optimal contiguous breakup has been freed.

METHOD AND APPARATUS FOR PERFORMING LINK DEFRAGMENTATION SUBJECT TO AN INTERFACE RATE CONSTRAINT

CROSS-REFERENCE TO RELATED APPLICATION(S)

The present application is related to U.S. Patent Application Publication No. 2004/0165540, filed Feb. 25, 2003 and entitled "System and Method for, Increasing Provisionable Bandwidth in Time-Division Multiplexed Communication Links," the disclosure of which is incorporated by reference herein.

FIELD OF THE INVENTION

The present invention relates generally to the field of data communication networks. More particularly, the invention relates to techniques for defragmenting time division multiplexed links within such networks, so as to facilitate the accommodation of additional traffic demands.

BACKGROUND OF THE INVENTION

Bandwidth fragmentation is an important issue in the context of well-known optical networking standards, such as synchronous optical network (SONET) and synchronous digital hierarchy (SDH). These standards generally specify that bandwidth is provisioned as contiguous time slots on a given time division multiplexed link. For example, an STS-3c circuit and an STS-12c circuit require three and 12 contiguous time slots of STS-1 level granularity, respectively, where STS-1 denotes the lowest level granularity, and corresponds to the SONET basic transmission rate of 51.84 Mbps.

The provisioning of contiguous time slots is typically referred to as "contiguous concatenation," and can result in fragmentation of a link. Such link fragmentation can cause a new traffic demand to be denied, even though a sufficient total number of slots exists, if there are insufficient contiguous slots to accommodate the demand.

Defragmentation refers generally to the process of reconfiguring the provisioned circuits so as to group the available time slots in a manner which better allows accommodation of additional demands.

Recently, virtual concatenation (VC) and link capacity adjustment scheme (LCAS) protocols have been developed which allow more efficient use of the existing fixed-bandwidth connections associated with circuit-switched SONET/SDH networks. The VC and LCAS protocols are described in greater detail in, for example, ITU-T standards documents G.707 and G.7042, respectively, both of which are incorporated by reference herein. These protocols avoid the fragmentation problem by eliminating the contiguous slot requirement. However, until all edge network elements support the new protocols, fragmentation will remain a serious issue for SONET/SDH networks.

U.S. Patent Application Publication No. 2004/0165540, cited above, discloses improved defragmentation techniques particularly well-suited for use in the SONET/SDH context. An illustrative embodiment comprises a defragmentation calculator, a candidate slot selector and a circuit mover. The defragmentation calculator calculates a defragmentation of a communication link, the defragmentation containing at least one granularity. The candidate slot selector finds reduced cost candidate slots for the at least one granularity. The circuit mover identifies target slots into which circuits occupying the candidate slots can be moved.

One particular example of a defragmentation algorithm of the type disclosed in U.S. Patent Application Publication No. 2004/0165540 is commonly known as "MöbiPack," and is described in S. Acharya et al., "MöbiPack: Optimal Hitless SONET Defragmentation in Near-Optimal Cost," IEEE Infocom, 2004, which is incorporated by reference herein. Such an algorithm may be implemented using the defragmentation calculator, candidate slot selector and circuit mover of the illustrative embodiment previously mentioned.

Despite the considerable advances provided by the defragmentation techniques disclosed in the above-cited references, a need remains for further improvements. For example, the MöbiPack algorithm performs defragmentation subject to granularity and alignment constraints imposed by the SONET/SDH standards, without requiring that any circuit be "torn down" and thus without causing any service disruption. This is referred to as "hitless" defragmentation, because the link is defragmented without any impact on live traffic. But an operational SONET/SDH network may impose additional constraints, which can make it difficult to determine if a link has been optimally defragmented. One such additional constraint is the constraint on allowable SONET/SDH rates on an interface, also referred to herein as the interface rate constraint. Thus, a defragmentation algorithm specifically designed to provide optimal hitless SONET/SDH defragmentation in the presence of an interface rate constraint would be highly desirable.

SUMMARY OF THE INVENTION

The present invention provides improved defragmentation algorithms which, in an illustrative embodiment, provide optimal hitless SONET/SDH defragmentation in the presence of an interface rate constraint.

In accordance with one aspect of the invention, techniques are provided for defragmenting at least one time division multiplexed link in a communication system, wherein provisioned circuits corresponding to traffic demands are assigned to particular time slots of the link. An optimum layout of free space for the link is computed, subject to an interface rate constraint that may be specified as a minimum cross-connect rate and a maximum cross-connect rate. Particular free slots from the optimum layout of free space are selected, and a hitless migration sequence is determined for migrating one or more of the circuits to one or more of the selected free slots. The time slot assignments of one or more of the circuits are adjusted in accordance with the determined migration sequence in order to defragment the link.

In the illustrative embodiment, a defragmentation algorithm is applied to a set of parallel links, and in an initialization phase the parallel links are concatenated into a single larger link whose size is the sum of the sizes of all individual links of the set. The computing, selecting, determining and adjusting steps of the algorithm are then applied to the single larger link. The interface rate constraint may be specified in terms of at least one of a maximum cross-connect rate and a minimum cross-connect rate for each of one or more of the links of the set, where the minimum rate and the maximum rate comprise a minimum STS circuit rate and a maximum STS circuit rate, respectively, for a given SONET/SDH link. The algorithm is also configured to accommodate other constraints, such as granularity and alignment constraints associated with the SONET/SDH standards.

In accordance with an aspect of the invention, the defragmentation algorithm is configured such that the link when defragmented is optimally packed, in that a layout of provisioned circuits on the link is such that the link can be filled completely to capacity with a minimum number of new demands. Also, the migration sequence may comprise a hitless migration sequence specifying a minimum number of circuit moves that can be performed to achieve the optimal packing without having to delete or reprovision any of the provisioned circuits.

In the illustrative embodiment, the optimum layout of free space includes free slots of a particular granularity only if those free slots could not be combined to create a free slot of a larger granularity. The process of computing the optimum layout of free space in this embodiment comprises starting with a lowest granularity and attempting to combine free slots of this granularity into ones of higher granularity. Any free slots for a given granularity $g_i$ which cannot be combined into ones of higher granularity are designated as free slots of the optimum layout of free space. Also, the determination of free slots in the optimal layout of free space for granularity $g_i$ may be based on one or more links each having a minimum cross-connect rate $\leq g_i$ and a maximum cross-connect rate $\geq g_i$, in order to take into account the interface rate constraint.

DETAILED DESCRIPTION OF THE INVENTION

The invention will be described herein in conjunction with an illustrative embodiment of a defragmentation algorithm, as well as a network-based system and example network nodes in which the algorithm may be implemented. It should be understood, however, that the invention is not limited to use with the particular defragmentation algorithm, network-based system or network node implementations described, but is instead more generally applicable to any communication application in which it is desirable to provide an improved link defragmentation subject to an interface rate constraint. Also, although described below in the context of the SONET standard, the invention is more generally applicable to SONET/SDH networks, where the term "SONET/SDH" as used herein denotes SONET only, SDH only, or a combination of SONET and SDH. The techniques described in the SONET context below can therefore be utilized in the SDH context as well, as will be readily appreciated by those skilled in the art.

The present invention in the illustrative embodiment provides an algorithm for determining the optimal defragmented state of a network in the presence of constraints on the allowable SONET interface rates, and for performing this defragmentation in a hitless manner.

The MöbiPack algorithm disclosed in the above-cited S. Acharya et al. reference achieves optimal defragmentation in a near-optimal number of circuit moves. The MöbiPack algorithm is consistent with the constraints imposed by the SONET standard but in some cases may fall short of providing a feasible solution when additional operational constraints, such as one or more interface rate constraints, are imposed on the network. Therefore, the present invention builds on the MöbiPack algorithm and provides in the illustrative embodiment a solution that addresses all the constraints addressed by the MöbiPack algorithm, such as the granularity and alignment constraints, as well as the interface rate constraint.

Figure 1:
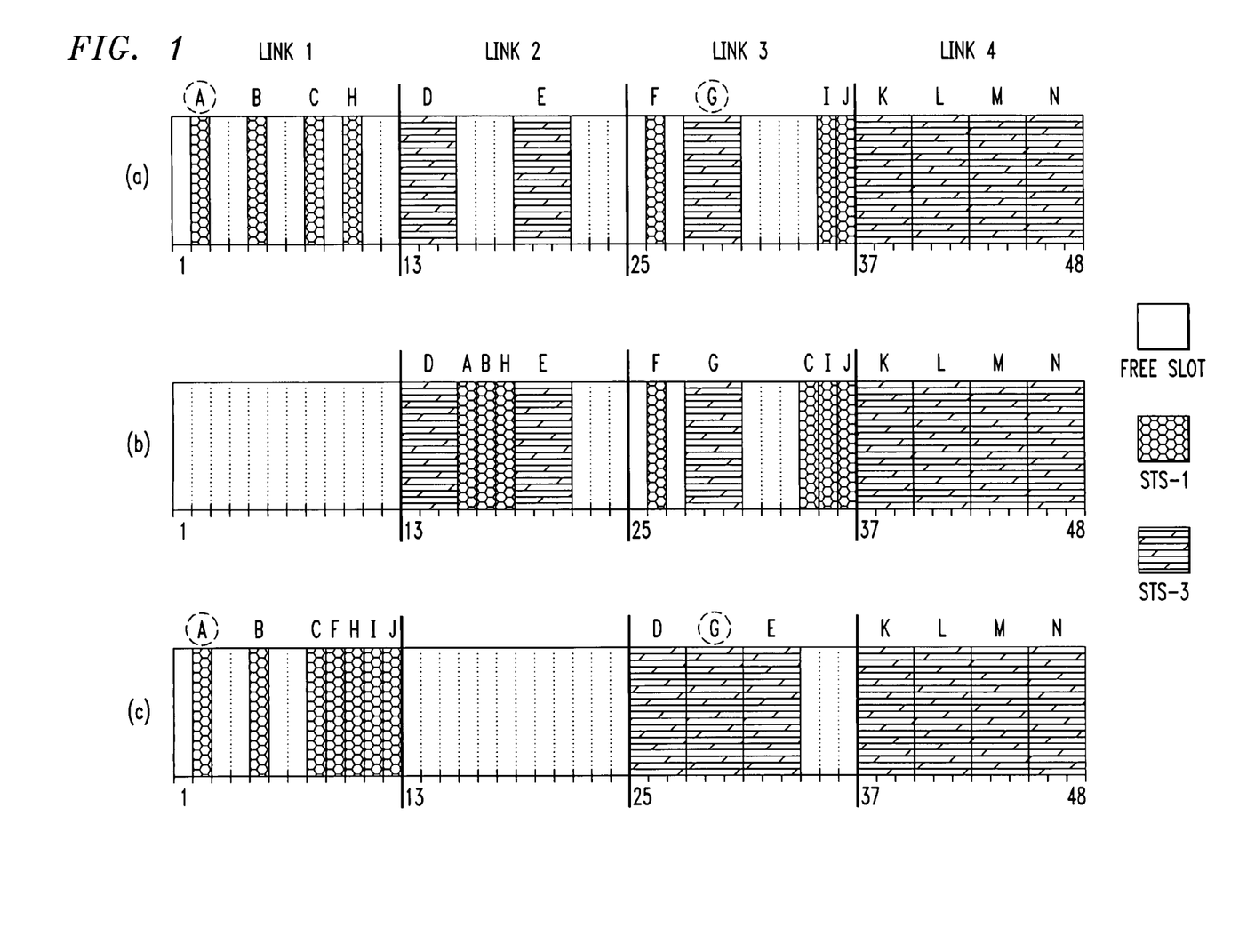
FIG. 1(a) shows an example of a set of links that are subject to defragmentation in an illustrative embodiment of the invention.
FIG. 1(b) shows the result of applying a MöbiPack defragmentation algorithm without an interface rate constraint to the set of links in FIG. 1(a).
FIG. 1(c) shows the result of applying a defragmentation algorithm with an interface rate constraint in accordance with the illustrative embodiment of the invention to the set of links in FIG. 1(a).

Consider by way of example a simple case involving four OC-12 links between a pair of nodes in a network. FIG. 1(a) shows the layout of circuits on the four links, with each slot representing a granularity of STS-1. The four links are denoted Link 1, Link 2, Link 3 and Link 4, and the circuits are denoted A through N. If a new request for an STS-12c circuit arrives, then it will be rejected as there is an absence of 12 contiguous free slots even though there is enough available bandwidth across the four links. Defragmenting the four links using the MöbiPack algorithm presented in the above-cited S. Acharya et al. reference leads to the layout of FIG. 1(b). This defragmentation creates one free STS-12c slot, two free STS-3c slots and two free STS-1 slots. This state is "better" than the state in FIG. 1(a) as it can support more circuits of high granularity and is denoted as the optimal design (OD).

A basic assumption in the MöbiPack algorithm is that if there are x consecutive free slots that can be used for a circuit of granularity x, then they can also be used by x/y circuits of any smaller granularity y. But even though the SONET standard allows this, the capabilities of a particular piece of SONET equipment may not. In fact, a SONET interface usually supports only a subset of the SONET cross-connect rates. This range is defined in the illustrative embodiment by a minimum cross-connect rate and a maximum cross-connect rate and all the rates within this range are supported by the interface. This interface rate constraint has an impact on defragmentation as now even with enough free slots for a circuit, the circuit can be provisioned on the slots only if the required rate is supported by the links. So even though the defragmentation may be theoretically possible, it may not be performed on the network.

Consider now a case in which Link 1 can only support a cross-connect rate of STS-1, Link 2 can support a minimum cross-connect rate of STS-3c and a maximum cross-connect rate of STS-12c, and Link 3 and Link 4 can each support a minimum cross-connect rate of STS-1 and a maximum cross-connect rate of STS-3c. Given these constraints, the optimal layout of free space achieved in FIG. 1(b) using the MöbiPack algorithm is not feasible as Link 2 cannot support an STS-1 circuit and creating 12 consecutive STS-1 slots in Link 1 is not useful as the link cannot support an STS-12c rate. Therefore, the optimal layout of free space that can meet these constraints is as shown in FIG. 1(c). This layout can be achieved in a hitless manner by moving the circuits in the sequence F, I, J, D and E. The distribution of free slots in this layout is one STS-12c slot, one STS-3c slot and five STS-1 slots. This layout is denoted the optimal design with interface rate constraint (ODIR).

Even though this layout is not as packed as the one in OD (one less STS-3c), this state is optimally packed given the above constraints. The reason is that packing Link 1 further, even while creating more contiguous free space, will not provide any benefits for higher level granularities as that link can support only STS-1 circuits. Also, Link 2 is the only candidate for creating an STS-12c slot. Thus there is a fundamental shift in the nature of the packing as the slots in the links can no longer be treated identically, without reference to the rate constraint. Note that there may be multiple link states that can be optimally packed. For example, circuit B could be moved to slot 3 but still the number of free slots of each granularity in this layout will remain the same as in ODIR. Also, the number of circuits to be moved will increase by one. Therefore ODIR remains a better solution.

In the remaining description, we disclose an algorithm to compute the optimal packing of a set of links subject to interface rate constraints. Then we show how to reach an optimally packed state in a hitless manner by using Phase III and Phase IV of the MöbiPack algorithm.

Before we formally describe the link defragmentation (LDF) problem, we define the operational constraint that makes this problem different than the one described in the above-cited S. Acharya et al. reference. As indicated previously, this operational constraint is referred to herein as the interface rate constraint. Note that this operational constraint is in addition to the granularity and alignment constraints already specified in the MöbiPack algorithm described in that reference.

As indicated above, each interface on a given piece of SONET equipment typically supports a range of STS rates and only circuits having a bandwidth within the supported range can be provisioned on the link associated with that interface. Accordingly, the range of STS rates is specified in the illustrative embodiment by associating a minimum cross-connect rate and a maximum cross-connect rate with the interface. For example, an interface with minimum cross-connect rate STS-3c and a maximum cross-connect rate STS-48c can support an STS-48c circuit, an STS-12c circuit or an STS-3c circuit, but not an STS-1 circuit. It is to be appreciated, however, that other interface rate constraints can be used in alternative embodiments of the invention.

We now formally define the LDF problem in the context of the illustrative embodiment as follows. Given a set of links, each of some capacity OC-N and a minimum and maximum cross-connect rate (STS-m and STS-M respectively) that it can support, a set of bidirectional circuits D={$d_1, d_2, \ldots d_k$} and a map $\psi=\{d_i \rightarrow \{l_i, t_i, g_i\}\}$ where $t_i$ is slot number at which demand $d_i$ of granularity $g_i$ starts, the LDF problem is to find a new map $\psi'=\{d_i \rightarrow \{l_i', t_i', t_i', g_i\}\}$ such that:

1. The SONET/SDH granularity and alignment constraints and the interface rate constraint are satisfied;

2. The link is optimally packed (Optimal Packing); and

3. A hitless circuit migration sequence is produced to go from $\psi$ to $\psi'$ in the minimum number of moves (Optimal Migration).

The link defragmentation algorithm in the illustrative embodiment attempts to achieve optimality on two fronts, namely, in quality of the packing and in the length of the migration sequence. We define these two subproblems as follows.

Optimal Packing Definition: A SONET link or set of links is optimally packed if the layout of demands on the link(s) is such that the link(s) can be filled completely to capacity with the fewest number of new circuit demands.

Based on this definition, one needs to determine the set of fewest demands that would completely fill up a link. Stated differently, any link defragmentation algorithm needs to create free space to fit each of these demands. We refer to this set of demands and therefore the layout as the optimal layout of free space (OLS).

Optimal Migration Definition: An optimal migration sequence is a sequence of minimum circuit moves that can be performed to achieve the optimal packing without having to delete or reprovision any circuits.

The MöbiPack algorithm described in the above-cited S. Acharya et al. reference is split into four steps, denoted Phase I through Phase IV, with Phase II of the algorithm determining the optimal packing or OLS. As mentioned in that reference, determining the optimal migration sequence is most likely an NP-hard problem. So Phase III and Phase IV of the MöbiPack algorithm use the OLS to create a migration sequence that was shown to be near-optimal.

The introduction of the interface rate constraint in the illustrative embodiment of the present invention means that different interfaces on the SONET equipment may support different cross-connect rates. As shown in FIG. 1(c), this affects the computation for determining the optimal packing. But once the OLS is computed, the hitless migration sequence can still be determined as in the MöbiPack algorithm, as long as all the data is properly initialized. Therefore, in the illustrative embodiment, we will show how to compute the optimal defragmentation with this additional constraint and how to initialize the data which can then be fed to Phase III and Phase IV of the MöbiPack algorithm to provide an optimal solution for the LDF problem as defined above.

The manner in which one may determine the OLS set for optimal packing will now be described in greater detail. We will denote the OLS as an ordered set of numbers, one corresponding to each STS rate in increasing order of granularity. Thus, a link with an OLS of {2, 2, 1} implies that on defragmentation, this link can satisfy two STS-1 circuits, two STS-3c circuits and one STS-12c circuit. The notation $O_j$ will be used to refer to the value of the $j^{th}$ granularity in the OLS set. Once the OLS is known, it can be used to verify if a link is indeed optimally packed.

A formula for computing the OLS for links of different bandwidth that can have "nailed-down" circuits is presented in the above-cited S. Acharya et al. reference. Nailed-down circuits are circuits which cannot be moved in the defragmentation process.

If a link can support only a subset of cross-connect rates, availability of one free STS-12c slot does not imply that four STS-3c circuits can be provisioned on that link as that link may not support an STS-3c cross-connect rate. Thus, the context of the free slots should also be noted. The formula below computes the OLS for a link taking into account the nailed down circuits as well as the cross-connect rate supported by the links. We present the formula below, in Equations (1) through (5), and then highlight certain steps. Initially, we define the following notation:

| | |
|---|---|
| G = | Ordered set of SONET circuit rates STS-x in increasing granularity order |
| $g_i$ = | SONET circuit rate with index i in G |
| h = | Total number of SONET circuit rates |
| $g_h$ = | Highest granularity SONET circuit rate |
| l = | Index for lowest granularity SONET circuit rate |
| $g_l$ = | Lowest granularity SONET circuit rate |
| $D_{i,j}$ = | Number of movable demands of granularity $g_i$ on links with minimum cross-connect rate (minXCRate) $g_j$ |
| $R_{x,y}$ = | $g_x/g_y$ |
| $U_{i,j}$ = | Maximum number of $g_i$ rate circuits that can be supported on links with minXCRate $g_j$, after accounting for any nailed-down |

-continued

| | |
|---|---|
| circuits | |
| $T_i =$ | Free slots of rate $g_i$ |
| $O_i =$ | Number of $g_i$ circuits in OLS |
| $F_i =$ | Total number of free slots (in STS-1 granularity) on all links with minXCRate $g_i$ |
| $A_{i+1,i} =$ | Free slots of granularity $g_{i+1}$ that can be obtained by combining free slots of $g_i$ |

Then, $$T_l = F_l \quad (1)$$

$$T_i = A_{i,i-1} + F_i/g_i \quad (2)$$

$$A_{i+1,i} = \min\left(T_i * R_{i,i+l}, \sum_{x=l}^{i} U_{i+1,x} - \sum_{x=i+1}^{h}\sum_{y=l}^{i} D_{x,y} * R_{z,i+1}\right) \quad (3)$$

$$O_i = T_i - A_{i+1,i} * R_{i+1,i} \quad (4)$$

$$O_h = T_h \quad (5)$$

In order to demonstrate the operation of the above formula, consider the four OC-12 links shown in the example of FIG. 1(a). Let STS-1demand A and STS-3c demand G be nailed down such that these demands cannot be used for defragmentation. We use this example to calculate the OLS using the above formula. Set G is $\{1, 3, 12\}$, set $\{D_{x,1}\}$ is $\{6, 4, 0\}$, set $\{D_{x,3}\}$ is $\{0, 2, 0\}$, set $\{U_{x,1}\}$ is $\{32, 7, 0\}$ and set $\{U_{x,3}\}$ is $\{0, 4, 1\}$, where x represents the index of granularities in G. The number of free slots $F_1$ is 14 and $F_3$ is 6. Note that the both the minimum cross-connect rate and the maximum cross-connect rate play a part in the computation of $U_{i,j}$, e.g., Link 2 does not contribute to $U_{1,3}$ and Link 1 does not contribute to $U_{3,1}$. The effect of non-movable demands on the computation of sets of this type is discussed in the above-cited Acharya et al. reference. The set $\{U_{i,j}\}$ sets the upper bound on the maximum number of demands of each granularity that may be provisioned on the links with minimum cross-connect rate of $g_j$, after accounting for all the nailed down demands.

The OLS as defined in the illustrative embodiment should have free slots of a particular granularity only if those free slots could not be combined to create a free slot of a larger granularity. So the general idea is to start with the lowest granularity and try to keep combining the free slots of this granularity into ones of higher granularity. Whatever slots cannot be combined, become members of OLS for that granularity $g_i$. At every step all the links that can support that particular granularity (that is, links with minimum cross-connect rate $\leq g_i$ and maximum cross-connect rate $\geq g_i$) contribute to this computation of free slots.

The OLS is then calculated as follows. A demand of granularity $g_i$, in addition to using the slots of granularity $g_i$, also eats up slots of granularity lower than $g_i$. Therefore while calculating the free available slots of a granularity $g_i$, the slots used up due to demands of granularity higher than $g_i$ also have to be considered. Accordingly, the upper limit on the number of free available slots of granularity $g_{i+1}$, when packing slots of granularity $g_i$, is the sum of all available slots of that granularity across all the links that support $g_i$ minus all the demands of granularity $g_{i+1}$ and higher on all these links. This gives us $$\Sigma_{x=l}^{i} U_{i+1,x} - \Sigma_{x=i+1}^{h} \Sigma_{y=l}^{i} D_{x,y} * R_{z,y}.$$

Therefore Equation (3) represents the number of free slots of granularity $g_{i+1}$, that could be created by combining free slots of granularity $g_i(T_l)$ subject to the upper limit described above. The total free slots of granularity $g_{i+1}$ is obtained by combining this number with the free slots of this granularity obtained from links that have the minimum cross-connect rate as $g_{i+1}$ and is represented by Equation (2). Note that links with minimum cross-connect rate of greater than $g_{i+1}$ can never contribute to slots of this granularity. Equation (4) represents the contribution of granularity $g_i$ to the OLS and is equal to the leftover free slots after creating slots of higher granularity. Equation (5) represents this for the highest granularity.

Using these equations, the OLS for the example of FIG. 1(a) computes to $\{5, 1, 1\}$. FIG. 1(c) represents the optimal packing with nailed down circuits A and G. As shown, only four demands need to move to achieve the optimal packing.

In the case of a single link, the OLS computation involves only one minimum cross-connect rate and one maximum cross-connect rate and is a special case of the LDF problem as described above.

Figure 2:
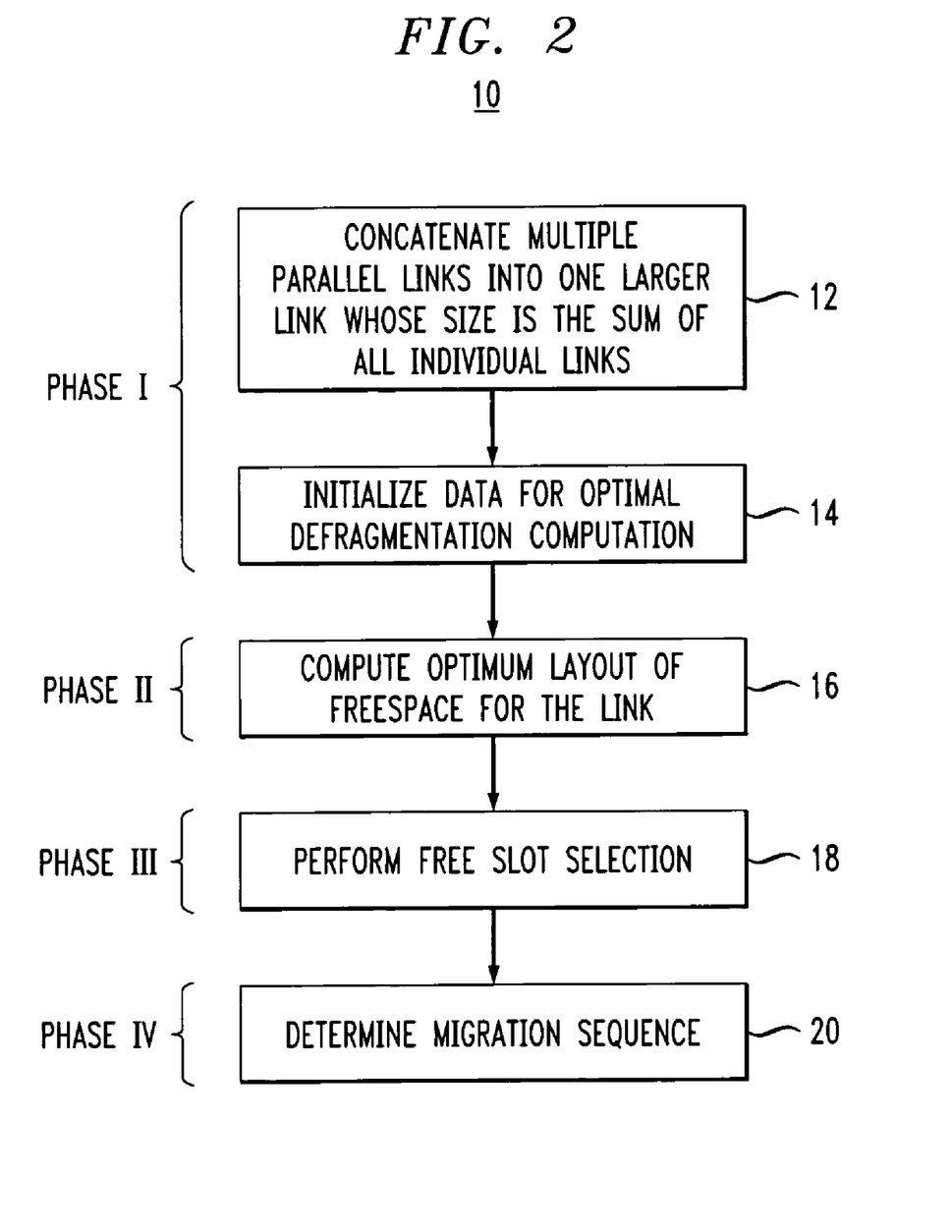
FIG. 2 is a flow diagram of the defragmentation algorithm with an interface rate constraint in the illustrative embodiment of the invention.

FIG. 2 shows the general steps of a link defragmentation algorithm 10 in the illustrative embodiment. Like the Möbi-Pack algorithm, the FIG. 2 algorithm 10 includes four phases, denoted Phase I, Phase II, Phase III and Phase IV. Phase I includes steps 12 and 14, and Phase II, Phase III and Phase IV include steps 16, 18 and 20, respectively.

Phase I is an initialization phase, and includes a number of one-time steps to map all the constraints and to generalize the algorithm. The first step, step 12 in the figure, involves concatenating multiple parallel links of the set into one big "megalink" whose size is the sum of the sizes of all the individual links. The next step, step 14 in the figure, is to initialize the data that is to be used for the computation of the optimal defragmentation.

In accordance with the alignment constraint, a SONET circuit can be provisioned starting only at very specific slots. For example, an STS-12c demand can start only at slots 1, 13, 25 and so on. However, this mapping is not straightforward if there are nailed down circuits, as described in the above-cited S. Acharya et al. reference. For example, if there is a nailed down STS-1 circuit on slot 14, then slot 13 cannot host an STS-12c circuit.

In addition, based on the supported cross-connect rates on each of the constituent links, the corresponding slots of the megalink may not be able to support certain rates. If the minimum and maximum cross-connect rates of the OC-12 link starting at slot 0 in the megalink are STS-3c, then no slots from 1 thru 12 can host an STS-1 circuit and slot l cannot host an STS-12c circuit either. We use the following notation to denote this mapping for each granularity $g_i$:

$S_i$=Set of valid starting slots for circuits of granularity $g_i$

This set $S_i$ can be created in one sweep of all the slots and so can the sets $\{U_{i,j}\}$ and $\{D_{i,j}\}$. Therefore the complexity of this phase is O(n) where n is the size of the megalink.

The algorithm also uses a bit mask $B_i$ corresponding to demands of granularity $g_i$. A bit of the bit mask is set for each slot used by that demand to indicate that no new demands of lower granularity can be assigned to that slot.

Phase II computes the OLS for the megalink based on the formula described above in conjunction with Equations (1) through (5). If present, any nailed down circuits are accounted for in this phase of the algorithm. The complexity for this phase is also O(n).

Figure 3:
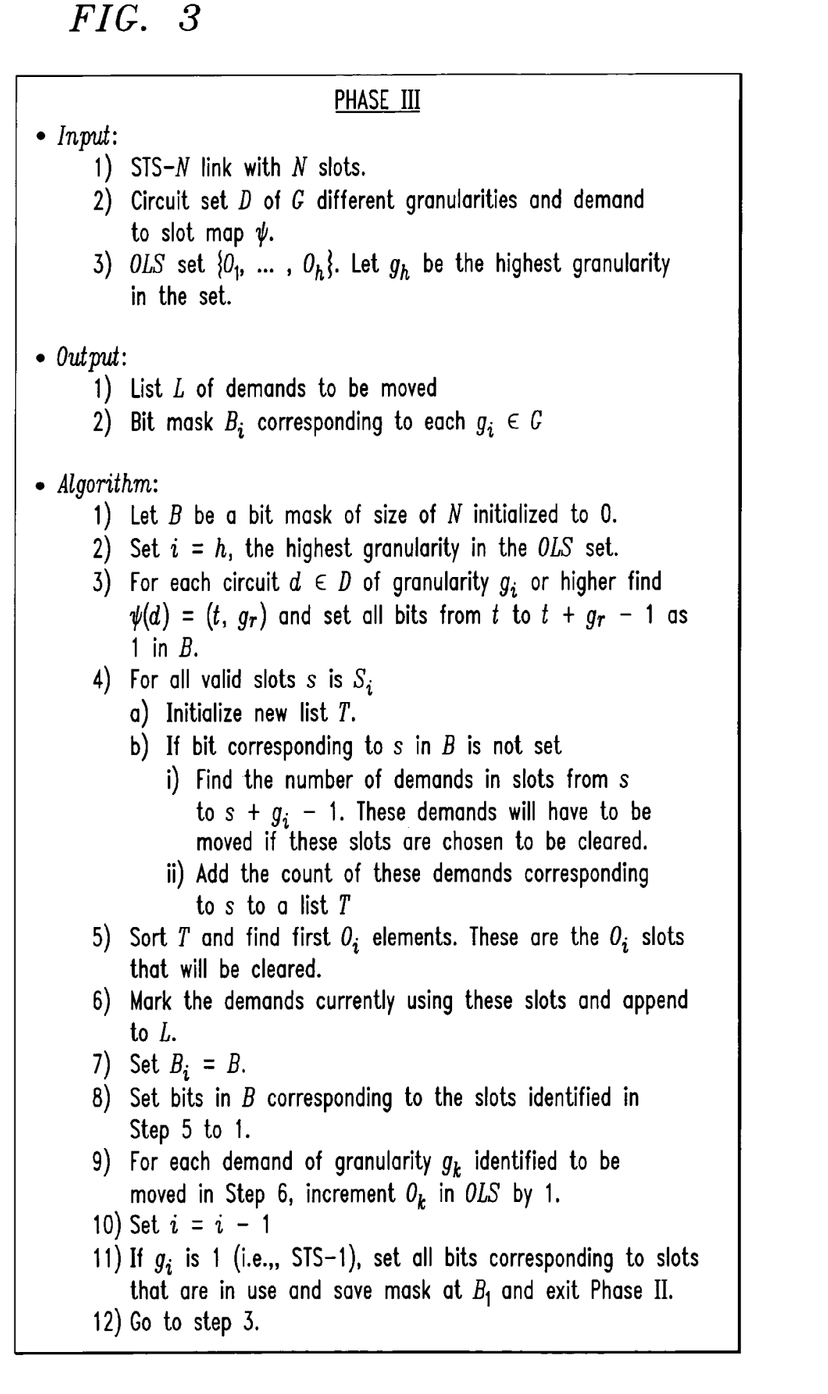
FIGS. 3 and 4 show details of respective Phase III and Phase IV portions of the defragmentation algorithm of FIG. 2.
Figure 4:
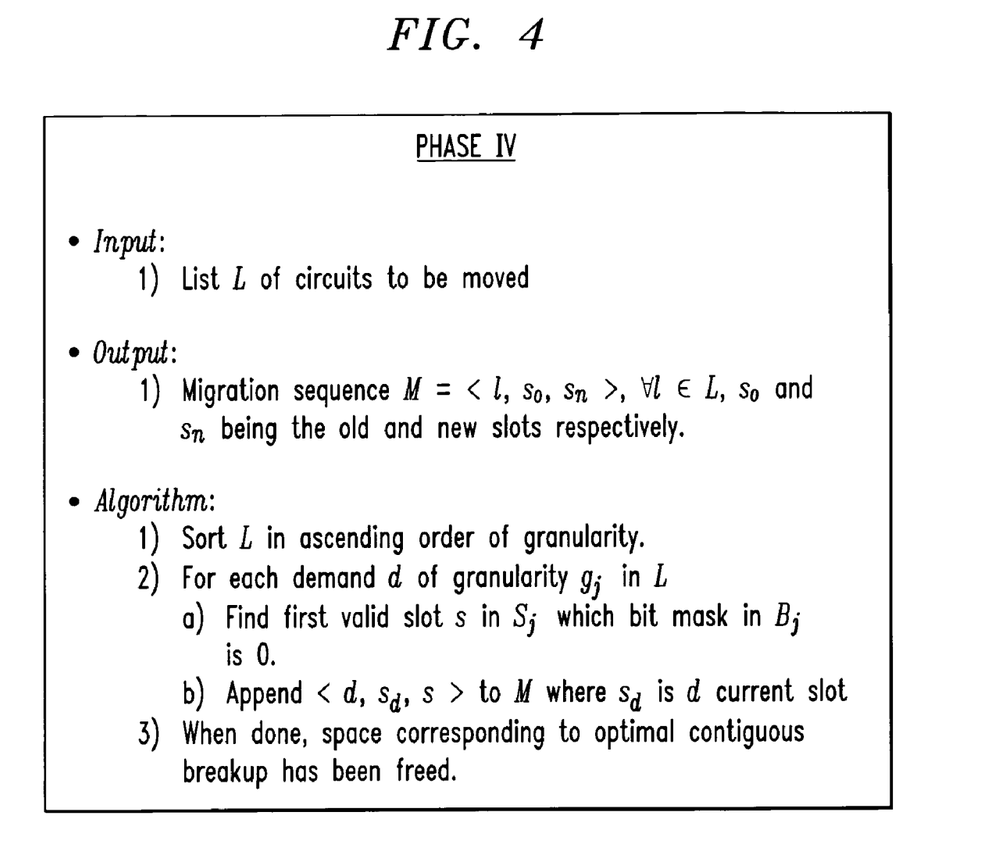

Phases III and IV are free slot selection and migration sequence determination stages, respectively. These two phases are used to compute the hitless migration sequence based on the OLS computed in Phase II and the set $S_i$ computed in Phase I. Phases III and IV may be the same as the corresponding phases of the MöbiPack algorithm, and are shown in greater detail in FIGS. 3 and 4, respectively.

The application of the link defragmentation algorithm 10 of FIG. 2 to the four link example of FIG. 1(a) gives the OLS as $\{5, 1, 1\}$ and the migration sequence as F→$\{L1, 9, 1\}$, I→$\{L1, 11, 1\}$, J→$\{L1, 12, 1\}$, D→$\{L3, 1, 3\}$, E→$\{L3, 7, 3\}$, where the migration notation F→$\{L1, 9, 1\}$ stands for the movement of circuit F, of rate STS-1, to Link 1 slot 9.

Advantageously, the link defragmentation algorithm of the illustrative embodiment provides a solution that addresses not only the granularity and alignment constraints addressed by the MöbiPack algorithm, but also interface rate constraints. Thus, the illustrative embodiment can perform hitless defragmentation subject to one or more interface rate constraints.

The defragmentation algorithm described above should be viewed as an illustrative example of a defragmentation algorithm in accordance with the invention, and it is to be appreciated that the invention can be implemented using other arrangements of algorithm steps. Also, a defragmentation algorithm in accordance with the invention can be implemented in a distributed manner, in a centralized manner, or using a hybrid combination of distributed and centralized implementation, and the invention is not restricted in this regard.

A given defragmentation algorithm may be implemented in a network-based system comprising a plurality of network nodes. Exemplary network and network node implementations of the invention will now be described with reference to FIGS. 5, 6 and 7.

Figure 5:
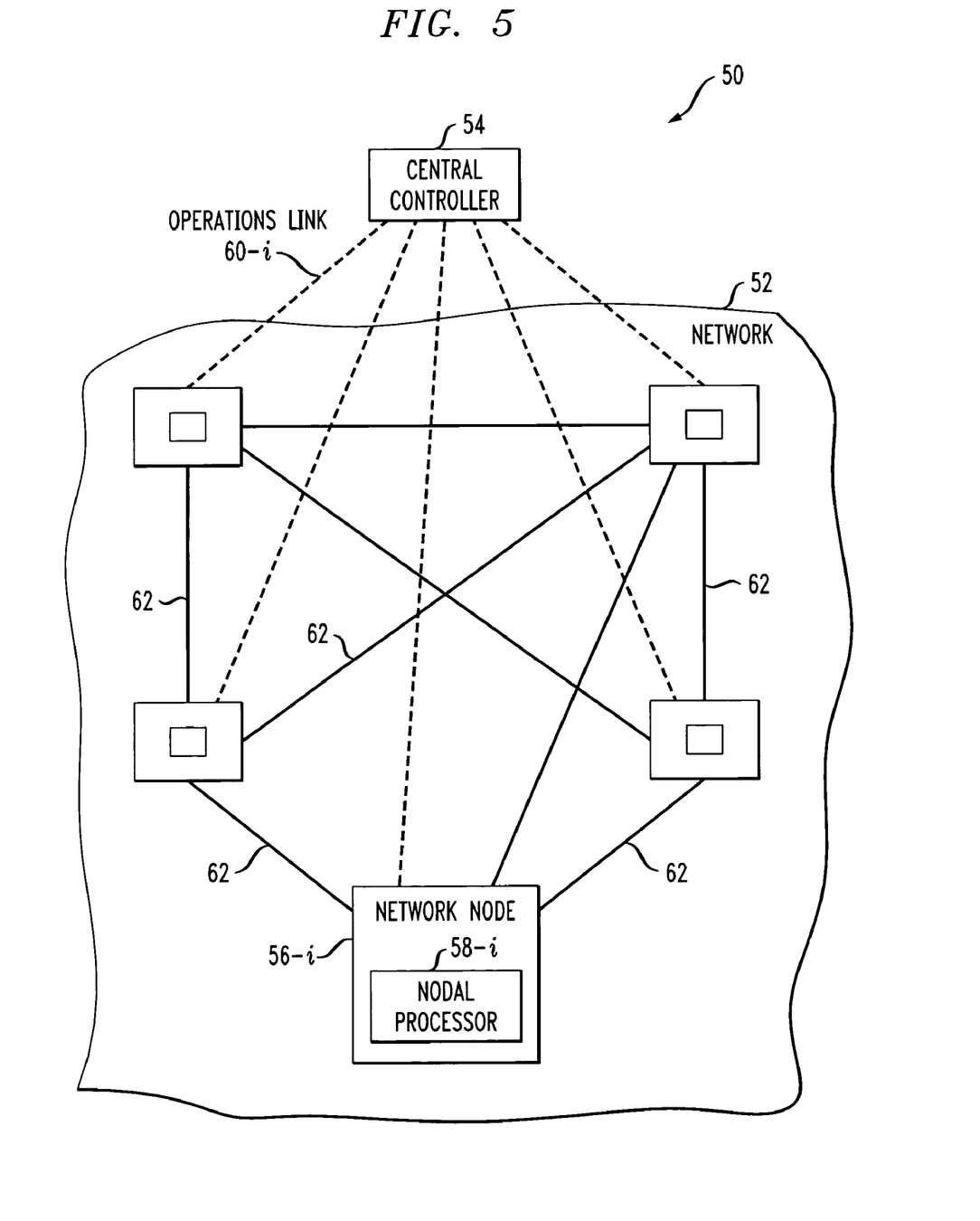
FIG. 5 shows an example network-based system in which a defragmentation algorithm in accordance with the invention is implemented.

FIG. 5 shows an exemplary network-based system 50 in which techniques of the present invention can be implemented. The system 50 includes a network 52 and a central controller 54. The network 52 may comprise, by way of example, an optical wavelength division multiplexed (WDM) mesh network, although the invention may be utilized with any type of network. The network 52 includes a number of nodes 56-i, i=1, 2, . . . N. Each of the nodes 56-i includes a corresponding nodal processor 58-i. The nodes 56-i of network 52 are interconnected by, for example, optical fiber connections 62. In this example, each of the nodes 56-i has a fiber connection to three other nodes. Each of the nodes 56-i is also connected to the central controller 54 via a corresponding operations link 60-i, shown as a dashed line in FIG. 5.

The central controller 54 and nodes 56-i may each represent a computer, server, router, gateway or other suitable digital data processor programmed to implement at least a portion of a defragmentation algorithm in accordance with the present invention. Thus, a defragmentation algorithm such as that shown in FIG. 2 may be implemented at least in part in software running on a processor of a node or other element of the network.

It should be noted that the system of FIG. 5 is considerably simplified for purposes of illustration. The invention is well suited for use in large-scale regional, national and international networks which may include many subnetworks, each having hundreds of nodes.

The central controller 54 may or may not participate in defragmentation techniques, depending upon the particular implementation. For example, a fully distributed implementation need not utilize the central controller 54, and may eliminate such a controller altogether.

Figure 6:
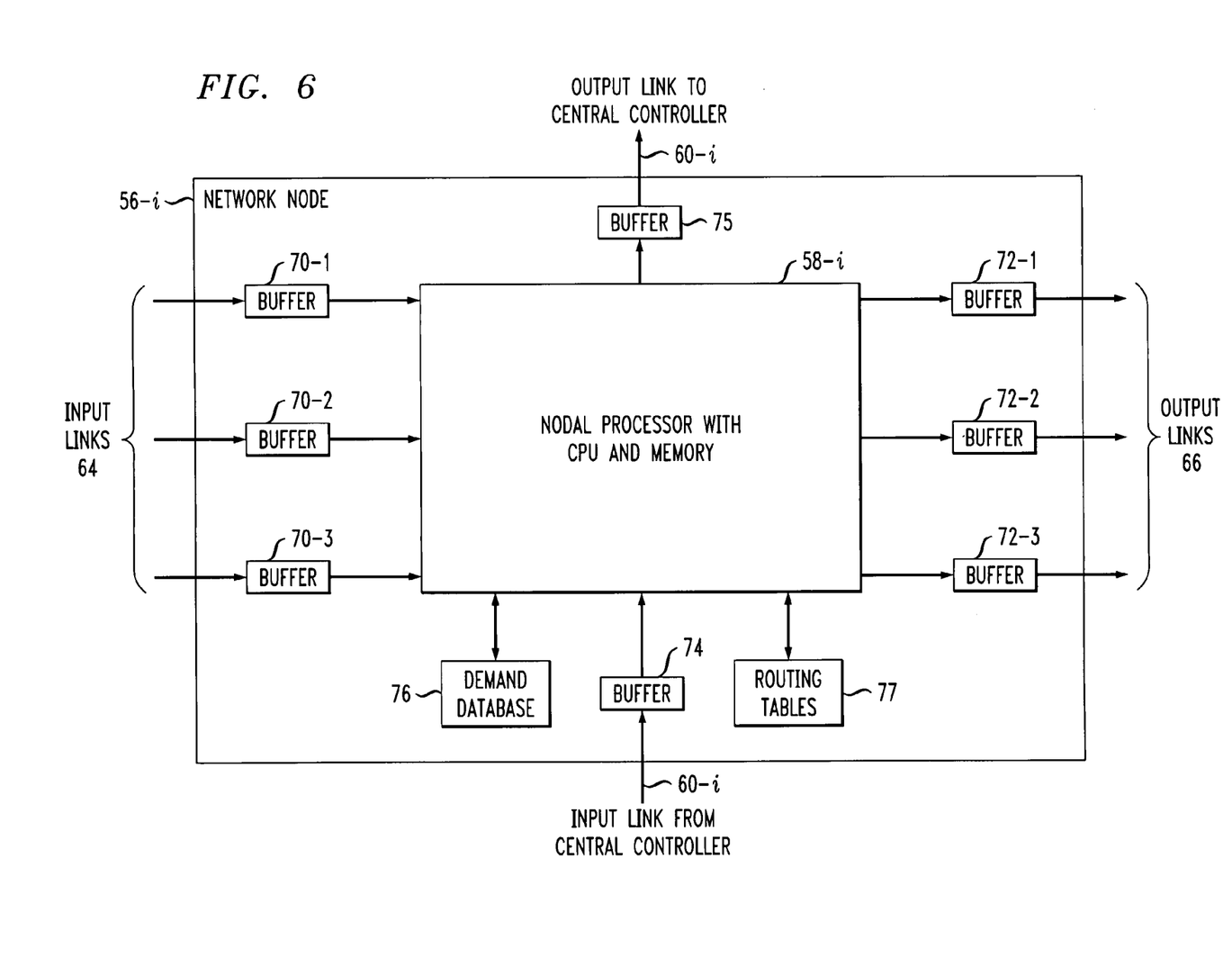
FIGS. 6 and 7 show examples of different possible implementations of a given network node in the FIG. 5 system.

FIG. 6 shows one of the nodes 56-i of network 52 in greater detail. The node 56-i includes a nodal processor 58-i which includes a central processing unit (CPU) and memory. A set of input links 64, corresponding to fiber connections 62 with three other nodes, are connected to buffers 70-1, 70-2 and 70-3 in node 56-i. The node 56-i supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical conversion for signals received on input links 64, while the buffers 72-1, 72-2 and 72-3 may provide electrical-to-optical conversion for signals to be transmitted on output links 66.

The operational link 60-i of node 56-i to the central controller 54 includes an input operational link which is coupled to nodal processor 58-i via an input buffer 74, and an output operational link which receives signals from nodal processor 58-i via an output buffer 75. The node 56-i also includes a demand database 76 for storing demands for network capacity, and a set of routing tables 77 which specify routes through the network for particular demands. The demand database 76 and routing tables 77 may be components of a common memory within node 56-i, and may be combined with or otherwise associated with the memory of nodal processor 58-i. The node 56-i has been simplified for purposes of illustration, and as noted above may include a substantially larger number of input and output links, as required for a given application.

Figure 7:
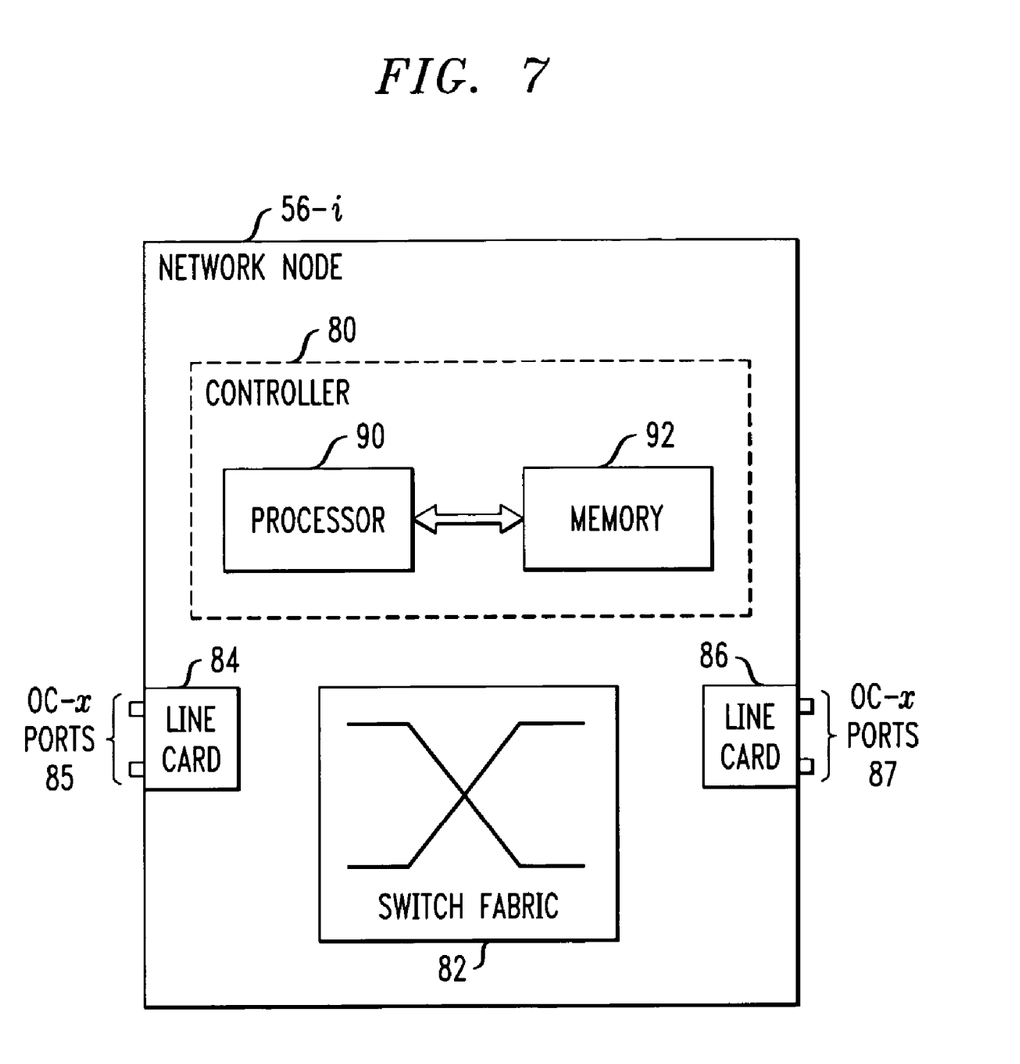

FIG. 7 shows another exemplary implementation of a given one of the network nodes 56-i of the FIG. 5 network-based system.

The network node 56-i in this example includes a controller 80, a switch fabric 82, a first line card 84 having a set of OC-x ports 85 associated therewith, and a second line card 86 having a set of OC-x ports 87 associated therewith. It should be understood that the node 56-i has again been simplified for purposes of illustration. For example, the node 56-i as shown in FIG. 7 may in practice include a substantially larger number of line cards and ports, as required for a given application.

The controller 80 includes a processor 90 and a memory 92. The processor 90 may be, e.g., a microprocessor, a microcontroller, an application-specific integrated circuit (ASIC) or other type of processing device, as well as portions or combinations of such devices. The memory 92 may include an electronic random access memory (RAM), a read-only memory (ROM) or other type of storage device, as well as portions or combinations of such devices. The memory 92 may be used to store a demand database for storing demands for network capacity, and a set of routing tables which specify routes through a corresponding network for particular demands. The routes may be determined at least in part using a defragmentation algorithm of the present invention.

As indicated previously, the node 56-i may be an element of an optical network or other type of network which includes a very large number of nodes, and possibly a central controller. One or more of the nodes and the central controller may each represent a computer, processor-based switch or other type of processor-based device configured to provide defragmentation in accordance with the invention.

The implementations described in conjunction with FIGS. 5, 6 and 7 are presented by way of example, and it is to be appreciated that the invention can be implemented in numerous other configurations. As another example, the present invention can be implemented using arrangements of a type described in the above-cited U.S. Patent Application Publication No. 2004/0165540.

The above-described embodiments of the invention are intended to be illustrative only. For example, the techniques of the invention may be applied to any defragmentation application, without regard to the type, arrangement or configuration of the network, network nodes, or communication protocols.

For example, although described in the context of traffic demands routed over SONET circuits, the example link defragmentation algorithm described herein can be modified in a straightforward manner so as to be applicable to a wide variety of other types of data traffic. The term "data traffic" as used herein is not intended to be limited with regard to information type, and may include any type of data, including, for example, digital audio, video, speech or other information signals, in any combination.

Also, the particular types of optimality described in the illustrative embodiments should not be construed as requirements of the invention, and other embodiments can use other types of optimality.

Again, in alternative embodiments the particular steps utilized in a given defragmentation algorithm may be varied from those steps shown in the foregoing example defragmentation algorithm.

These and numerous other alternative embodiments within the scope of the following claims will be readily apparent to those skilled in the art.

We claim:

1. A method of defragmenting at least one time division multiplexed link in a communication system, wherein provisioned circuits corresponding to traffic demands are assigned to particular time slots of the link, the method comprising the steps of:
   computing an optimum layout of free space for the link subject to at least an interface rate constraint;
   selecting particular free slots from the optimum layout of free space;
   determining a hitless migration sequence for one or more of the circuits to one or more of the selected free slots; and
   adjusting the time slot assignments of said one or more circuits in accordance with the determined migration sequence in order to defragment the link.

2. The method of claim 1 wherein the at least one link comprises a set of parallel links, and the method further comprises the step of concatenating the parallel links into a single larger link whose size is the sum of the sizes of all individual links of the set, wherein the computing, selecting, determining and adjusting steps are applied to the single larger link.

3. The method of claim 1 wherein the time division multiplexed link comprises a SONET/SDH link.

4. The method of claim 1 wherein the interface rate constraint is specified in terms of at least one of a maximum rate and a minimum rate.

5. The method of claim 4 wherein the interface rate constraint is specified in terms of at least one of a maximum cross-connect rate and a minimum cross-connect rate.

6. The method of claim 4 wherein the interface rate constraint is specified in terms of a range defined by the minimum rate and the maximum rate.

7. The method of claim 4 wherein the minimum rate and the maximum rate comprise a minimum STS circuit rate and a maximum STS circuit rate, respectively, for a SONET/SDH link.

8. The method of claim 1 wherein the optimum layout of free space is determined subject to granularity and alignment constraints associated with SONET/SDH standards.

9. The method of claim 1 wherein the optimum layout of free space is determined at least in part by computing:

$$T_l = F_l \tag{1}$$

$$T_i = A_{i,i-1} + F_i/g_i \tag{2}$$

$$A_{i+1,i} = \min\left(T_i * R_{i,i+1}, \sum_{x=l}^{i} U_{i+1,x} - \sum_{x=i+1}^{h} \sum_{y=l}^{i} D_{x,y} * R_{z,i+1}\right) \tag{3}$$

$$O_i = T_i - A_{i+1,i} * R_{i+1,i} \tag{4}$$

$$O_h = T_h \tag{5}$$

where

| | |
|---|---|
| G = | Ordered set of SONET circuit rates STS-x in increasing granularity order |
| $g_i$ = | SONET circuit rate with index i in G |
| h = | Total number of SONET circuit rates |
| $g_h$ = | Highest granularity SONET circuit rate |
| l = | Index for lowest granularity SONET circuit rate |
| $g_l$ = | Lowest granularity SONET circuit rate |
| $D_{i,j}$ = | Number of movable demands of granularity $g_i$ on links with minimum cross-connect rate $g_j$ |
| $R_{x,y}$ = | $g_x/g_y$ |
| $U_{i,j}$ = | Maximum number of $g_i$ rate circuits that can be supported on links with minimum cross connect rate $g_j$, after accounting for any nailed-down circuits |
| $T_i$ = | Free slots of rate $g_i$ |
| $O_i$ = | Number of $g_i$ circuits in the optimum layout of free space |
| $F_i$ = | Total number of free slots (in STS-1 granularity) on all links with minimum cross-connect rate $g_i$ |
| $A_{i+1,i}$ = | Free slots of granularity $g_{i+1}$ that can be obtained by combining free slots of $g_i$. |

10. The method of claim 1 wherein the link when defragmented is optimally packed in that a layout of provisioned circuits on the link is such that the link can be filled completely to capacity with a minimum number of new demands.

11. The method of claim 10 wherein the hitless migration sequence comprises a migration sequence specifying a minimum number of circuit moves that can be performed to achieve the optimal packing without having to delete or reprovision any of the provisioned circuits.

12. The method of claim 1 wherein the optimum layout of free space includes free slots of a particular granularity only if those free slots could not be combined to create a free slot of a larger granularity.

13. The method of claim 1 wherein the step of computing the optimum layout of free space comprises starting with a lowest granularity and attempting to combine free slots of this granularity into ones of higher granularity, wherein any free slots for a given granularity $g_i$ which cannot be combined into ones of higher granularity are designated as free slots of the optimum layout of free space.

14. The method of claim 1 wherein the determination of free slots in the optimal layout of free space for granularity $g_i$ is based on one or more links each having a minimum cross-connect rate $\leq g_i$ and a maximum cross-connect rate $\geq g_i$.

15. The method of claim 1 wherein the step of computing the optimum layout of free space involves determining a bit mask $B_i$ corresponding to a demand of granularity $g_i$, wherein a bit of the bit mask is set for each slot used by that demand to indicate that no new demands of lower granularity can be assigned to that slot.

16. The method of claim 1 wherein at least one of the computing, selecting, determining and adjusting steps is implemented at least in part in software running on a processor of a node or other element of the network.

17. An apparatus for use in defragmenting at least one time division multiplexed link in a communication system comprising a network having a plurality of nodes, wherein provisioned circuits corresponding to traffic demands are assigned to particular time slots of the link, the apparatus comprising:
   a processor; and
   a memory coupled to the processor;
   wherein the processor is operative to perform the steps of:
   computing an optimum layout of free space for the link subject to at least an interface rate constraint;
   selecting particular free slots from the optimum layout of free space;
   determining a hitless migration sequence for one or more of the circuits to one or more of the selected free slots; and
   adjusting the time slot assignments of said one or more circuits in accordance with the determined migration sequence in order to defragment the link.

18. The apparatus of claim 17 wherein the apparatus is implemented in a distributed manner within one or more of the network nodes.

19. The apparatus of claim 17 wherein the apparatus is implemented in a centralized manner utilizing a central controller.

20. An article of manufacture comprising a computer-readable medium storing one or more programs for use in defragmenting at least one time division multiplexed link in a communication system, wherein provisioned circuits corresponding to traffic demands are assigned to particular time slots of the link, the one or more programs when executed in a processor performing the steps of:
   computing an optimum layout of free space for the link subject to at least an interface rate constraint;
   selecting particular free slots from the optimum layout of free space;
   determining a hitless migration sequence for one or more of the circuits to one or more of the selected free slots; and
   adjusting the time slot assignments of said one or more circuits in accordance with the determined migration sequence in order to defragment the link.

* * * * *